United States Patent [19]

Kizer et al.

[11] 4,290,990

[45] Sep. 22, 1981

[54] METHOD OF FORMING THE MOUNTING PORTION OF A SIDEWALL PROTECTOR

[75] Inventors: Richard W. Kizer, Morton; Arlynn W. Anderson, Peoria; Robert W. Untz, Hanna City, all of Ill.

[73] Assignee: Caterpillar Tractor Co., Peoria, Ill.

[21] Appl. No.: 187,693

[22] Filed: Sep. 16, 1980

Related U.S. Application Data

[62] Division of Ser. No. 131,729, Dec. 17, 1979, Pat. No. 4,247,275.

[51] Int. Cl.³ .................... B29C 11/00; B29C 23/00
[52] U.S. Cl. .................... 264/156; 425/298
[58] Field of Search .................... 264/156, 326; 425/36, 425/37, 290, 304, 395

[56] References Cited

U.S. PATENT DOCUMENTS

| | | | |
|---|---|---|---|
| 2,339,792 | 1/1944 | Milano | 425/395 |
| 2,346,335 | 4/1944 | Sidnel | 425/395 |
| 2,561,050 | 7/1951 | Charron et al. | 425/304 X |
| 2,763,028 | 9/1956 | Blake | 425/290 X |
| 2,779,097 | 1/1957 | Frazier | 425/290 X |
| 3,031,354 | 4/1962 | Williams | 425/37 X |
| 3,486,198 | 12/1969 | Lewis | 425/36 |
| 3,517,410 | 6/1970 | Rapisardo | 264/156 X |
| 3,948,707 | 4/1976 | Grawley et al. | 264/326 X |

Primary Examiner—J. Howard Flint, Jr.
Attorney, Agent, or Firm—John W. Grant

[57] ABSTRACT

A method and apparatus for forming the mounting portion of a sidewall protector includes a rigid mold (19) in which a sidewall protector (12) can be formed and a separate plate assembly (29,31) which is moveable toward the rigid mold to form the mounting holes (10), central opening 11, and a pair of annular ribs (14,16) on opposite sides of the sidewall protector. Movement of the plate (32) is done by a plurality of springs (47) each positioned between the plate (32) and an enlarged head portion (48) of a pin (46). The springs are compressed by a linear actuator (43) and the pin (46) is connected to the mold (19) by a dowel (54) inserted through a hole (53) in the pin (46) to maintain the compression on the springs (47). This apparatus permits the use of automated strip applying equipment for laying up the sidewall protector within the mold (19) while the plate assembly (29,31) accurately forms the mounting portion which includes the mounting holes (10), annular opening (11), and the annular ribs (14,16).

3 Claims, 4 Drawing Figures

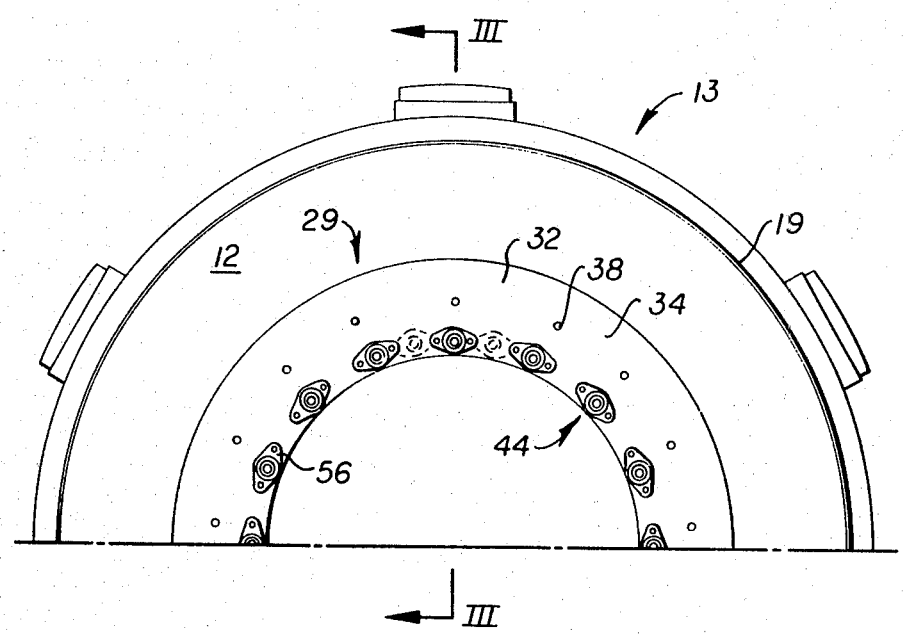
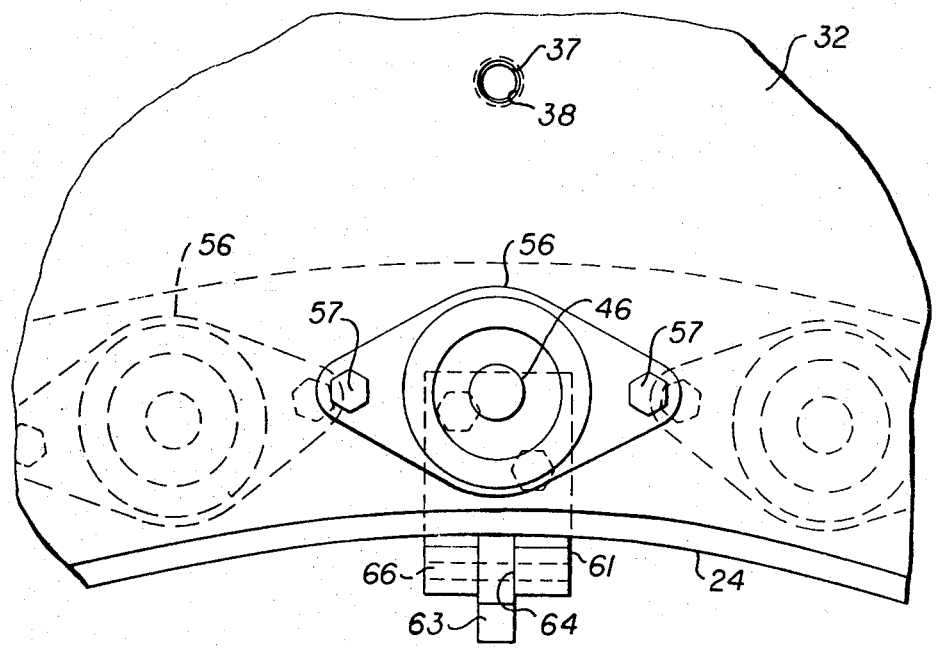

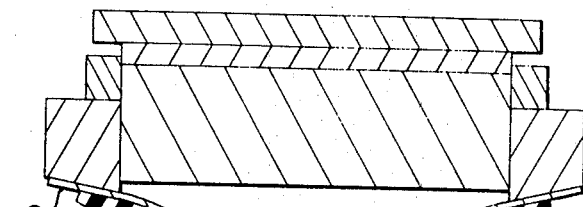
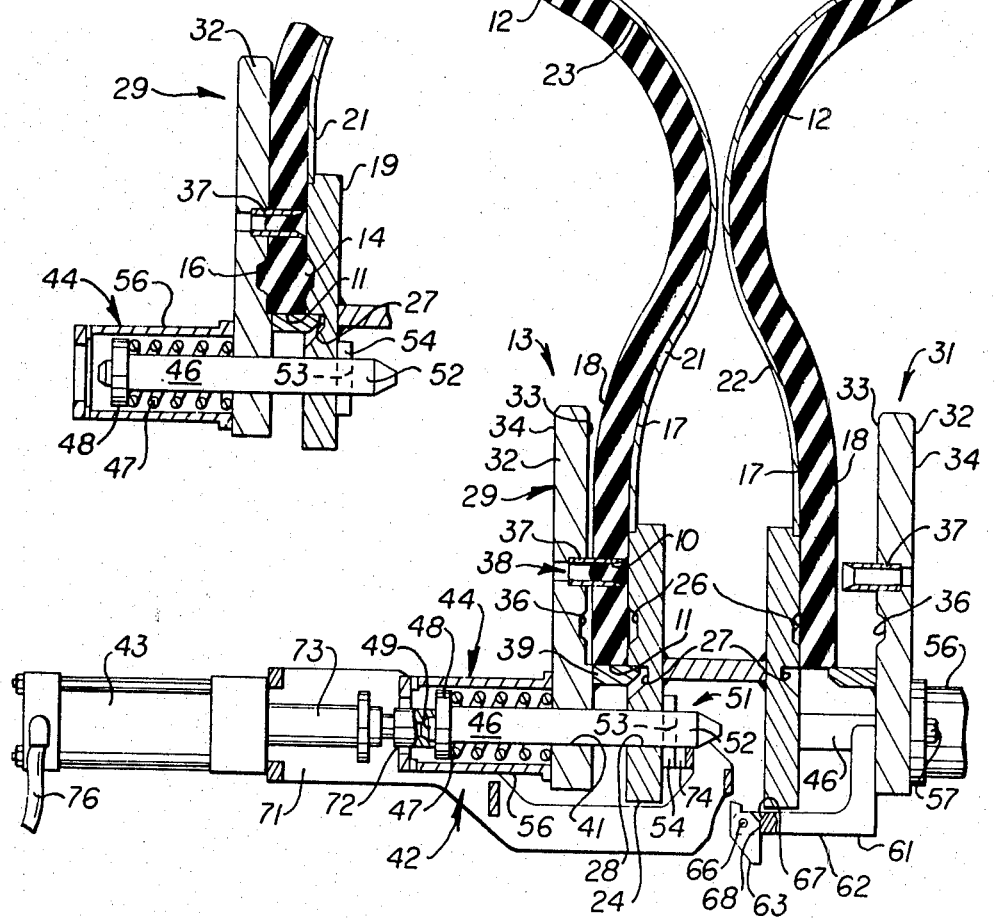

METHOD OF FORMING THE MOUNTING PORTION OF A SIDEWALL PROTECTOR

This is a division of Ser. No. 131,729, filed Dec. 17, 1979, now U.S. Pat. No. 4,247,275.

TECHNICAL FIELD

This invention relates generally to a sidewall protector and more particularly to the method of forming the mounting portion of a sidewall protector.

BACKGROUND ART

Sidewall protectors are used on some large earthmoving tires being operated in rocky conditions where the sidewalls of the tires are susceptible to abrasion and cutting. The sidewall protectors are usually made of rubber and are contoured to envelope the bulge in the sidewall of the tires. Mounting holes are commonly provided at the inner periphery for fastening the sidewall protectors to the rim on which the tire is mounted.

One problem associated with such sidewall protectors is that of how to build them economically on a production basis with a high degree of uniformity. Although several existing techniques currently used for building a tire carcass with strips of extruded rubber can be utilized in the building operation the completely different structure poses problems not encountered in the building of tires. For example, the sidewall protectors have a plurality of mounting holes at the inner periphery thereof. Additionally some sidewall protectors have a pair of side ribs concentric with and adjacent the inner periphery. Since tires do not have comparable mounting holes or the equivalent of the ribs, new apparatus and procedures were required for forming such holes and ribs.

The present invention is directed to overcoming one or more of the problems as set forth above.

DISCLOSURE OF THE INVENTION

In an aspect of the present invention a method of forming a mounting portion of an annular article made from uncured elastomer on a rigid mold comprises the steps of, moving a plate having a plurality of punches extending from one side thereof toward the mold, piercing the article with the punches and forming a plurality of holes in the article, connecting the plate to the rigid mold with at least a portion of the article sandwiched therebetween, placing the mold, annular article and plate in a vulcanizing apparatus and curing the elastomer annular article thereon.

The invention solves the problem of how to build sidewall protectors and form the mounting portion thereof on a production basis with a high degree of uniformity by providing a mold, in which the basic sidewall protector is formed, and a separate device for forming the mounting portion of the sidewall protector while it remains in the mold. Since uncured rubber has a high resistance to flow, the device is resiliently biased toward the mold so that movement of the device to the final finish position takes place during the curing process wherein the rubber is heated to a vulcanizing temperature at which rubber flows more easily.

BRIEF DESCRIPTION OF THE DRAWINGS

FIG. 1 is a partial side elevational view of an embodiment of the present invention.

FIG. 2 is a somewhat enlarged partial elevational view of a portion of the apparatus of FIG. 1.

FIG. 3 is an enlarged sectional view taken along lines III—III of FIG. 1 and illustrating one type of linear actuator utilized with the present invention.

FIG. 4 is a view similar to FIG. 3 but showing certain elements in another position.

Best Mode for Carrying Out the Invention

Referring now to FIGS. 1 and 3 of the drawings, an apparatus for forming mounting holes 10 and a central opening 11 in an elastomeric annular article, for example, a sidewall protector 12 is generally indicated by the reference numeral 13. The apparatus also forms a pair of annular ribs 14,16 extending laterally outwardly from side surfaces 17,18 of the article 12 and concentric with the central opening 11. The apparatus 13 includes a rigid mold 19 having first and second mold portions 21,22 connected in a back to back relationship by suitable structural members. Since the first and second mold portions are structurally identical only the first mold portion 21 will be described in detail with common reference numerals applied to counterpart elements of the second mold portion 22.

As more clearly shown in FIG. 3 the first mold portion 21 has a surface 23 matching the side surface 17 of the sidewall protector 12. The first mold portion has a central opening 24 and a pair of concentric grooves 26,27 in the surface 23 concentric with the central opening 24. A plurality of holes, one shown at 28, extend through the first mold portion and are arranged in a pattern concentric with the central opening 24.

First and second plate assemblies 29,31 are releasably connectable to the first and second mold portions 21,22 respectively. The first plate assembly 29 is shown in FIG. 3 connected to the first mold portion 21 at a position at which the mounting holes 10 are partially formed as will be hereinafter described. The second plate assembly 31 is shown in FIG. 3 loosely connected to the second mold portion 22 prior to its being moved to the position illustrated by the first plate assembly 29 in FIG. 3. In FIG. 4 the first plate assembly 29 is shown connected to the first mold portion 21 and at a position which it will occupy after the sidewall protector 12 is vulcanized as will be hereinafter described.

Since the first and second plate assemblies 29,31 are structurally identical only the first plate assembly 29 will be described with comparable reference numerals applied to counterpart elements of the second plate assembly 31. The first plate assembly 29 includes an annular plate 32 having opposite sides 33,34. The side 33 is shaped to match a portion of the other side surface 18 of the sidewall protector 12 and has an annular groove 36 formed therein to form the annular rib 16. A plurality of tubular punches 37 are seated in holes 38 and extend axially outwardly from the side 33. The punches 37 are arranged in a predetermined pattern matching the pattern of the mounting holes 10 in the sidewall protector 12. An annular ring 39 is connected to and extends axially outwardly from the side 33 of the annular plate 32 and provides a means for forming the central opening 11 in the sidewall protector 12. At the position shown in FIG. 4 the distal end of the annular ring 39 extends into the groove 27 which acts as a pilot for precisely aligning the plate 32 relative to the first mold portion 21. A plurality of holes 41 extend through the plate 32 and are positioned in axial alignment with the holes 28 in the first mold portion 21.

A means 42 is provided for moving the first plate assembly 29 toward the first mold portion 21. The means 42 can include, for example, means 44 for resiliently biasing the plate 32 toward the first mold portion 21 in response to being compressed by a linear actuator 43. The resilient biasing means 44 can include a plurality of pins 46 individually slidably extendable through the holes 28,41, a plurality of springs 47 each encircling one of the pins 46 and positioned between the annular plate 32 and an enlarged head portion 48 at an end 49 of the respective pin, and a means 51 for connecting an opposite end 52 of each pin to the first mold portion 21. The means 51 can include, for example, a hole 53 extending transversely through each pin 46 and a dowel 54 slidably insertable into the hole 53. Each of a plurality of cages 56 encapsulates a respective spring 47 and is connected to the annular plate 32 by bolts 57.

As more clearly shown in FIGS. 2 and 3, a pair of L-shaped members 61 are connected to the side 33 of plate 32 (only the member connected to plate 32 of plate assembly 31 is shown). Each member 61 has an arm 62 extendable through the central opening 24 of the first mold portion 21. A lock 63 is positioned within a slot 64 in the respective arm 62 and is pivotally connected to the arm by a pin 66. A stop surface 67 is formed on the lock 63 and is engageable with a stop surface 68, which forms the back surface of the slot 64, for temporarily holding the plate 32 relative to the respective mold portion and for preventing inadvertent separation of the plate 32 from the respective mold portion 21,22 during the process of disconnecting the plate 32 from the respective mold portion.

The linear actuator 43 is mounted on a frame 71 and has an adapter head 72 connected to a piston rod 73. A pair of rollers, one partially shown at 74, are connected to the frame. Pressurized fluid can be selectively delivered to the actuator 43 through a line 76 from a source of pressurized fluid, not shown, in the usual manner.

INDUSTRIAL APPLICABILITY

In the use of the apparatus 13, with the first and second plate assemblies 29,31 removed from the mold 19 a pair of the sidewall protectors 12 are laid up in the respective first and second mold portions 21,22 from extruded strips of uncured rubber while the mold is being rotated about its central axis in a suitable rotating device. Preferably, the inner portions of the sidewall protectors are built slightly oversize to provide an excess of rubber for flowing rubber into the grooves 26,36 to form the annular ribs 14,16 during curing.

One of the plate assemblies 29,31 is then loosely connected to the respective mold portion 21,22 with the pins 46 being in axial alignment with holes 28 in the mold portion. The frame 71 carrying the linear actuator 43 is then positioned with the rollers 74 in engagement with the backside of the respective mold portion 21,22 and the adaptor head 72 in engagement with the end 49 of the pin 46. Pressurized fluid is then delivered to the linear actuator 43 through the line 76 causing the piston rod 73 to extend. Extension of the piston rod 73 moves the pin 46 inwardly compressing the spring 47 which biases the plate 32 toward the mold portion and causes the adjacent punches 37 to partially pierce the uncured rubber making up the sidewall protector 12. The degree of penetration by the punches 37 will be limited and will depend on the compression of the spring 47 and the resistance to flow of the uncured rubber. The dowel 54 is inserted into the hole 53 in the pin 46 when the hole 53 becomes visible at the backside of the mold portion. The fluid pressure in the linear actuator 43 is then released leaving the pin 46 in the position shown in FIG. 3 wherein the spring 47 is exerting a biasing force against the plate 32 urging it toward the mold portion.

The frame 71 and hence the linear actuator 43 is then moved to the other pins 46 in any desirable sequence and the above process repeated until all the pins 46 are connected to the mold portion and all of the springs 47 compressed. The plate 32 of the other plate assembly 29,31 is then connected to the other mold portion 21,22 and the above process repeated.

When both plate assemblies 29,31 are connected to the respective first and second mold portions 21,22 the apparatus 13 is then positioned within a vulcanizing chamber such as an autoclave. Steam is then circulated through the vulcanizing chamber heating the uncured rubber forming the sidewall protectors to a curing temperature. As the temperature of the rubber increases its resistance to flow decreases so that the springs 47 urge the plates 32 toward the respective first and second mold portions 21,22 thereby completing the piercing of the holes 10. Simultaneously the inner portion of the sidewall protector between the plate 32 and the respective mold portion 21,22 is squeezed causing the uncured rubber to flow into the grooves 26,36 forming the annular ribs 14,16. Also the annular ring 39 enters the groove 27 so that the central opening 11 of the sidewall protector 12 is accurately formed. Engagement of the punches 37 with the respective mold portion serves as a stop for controlling the thickness of the mounting portion of the sidewall protector.

After the sidewall protectors are cured the apparatus 13 is removed from the vulcanizing chamber. The linear actuators 43 are again utilized to compress the springs 47 so that each dowel 54 can be removed from the associated hole 53, thereby uncoupling the pin 46 from the respective mold portion 21. With the lock 63 rotated clockwise 90° from the position shown in FIG. 3 the plate assemblies 29,31 are then removed and the cured sidewall protector 12 stripped from the first and second mold portions 21,22.

Thus, the method of forming a mounting surface of an annular article made from uncured elastomer on a rigid mold comprises the steps of moving a plate having a plurality of punches extending from one side thereof toward the mold, piercing the article with the punches and forming the holes in the article, connecting the plate to the rigid mold with at least a portion of the article sandwiched therebetween, placing the mold, annular article and plate in a vulcanizing apparatus and curing the elastomer annular article. The step of moving the plate toward the mold includes the step of resiliently biasing the plate toward the mold during the curing step. The resiliently biasing step includes the step of compressing a plurality of springs positioned between the plate and an enlarged head at one end of a pin and connecting the other end of the pin to the mold.

Although the apparatus 13 is described as having first and second mold portions 21,22 and first and second plate assemblies 29,31, in some cases the apparatus can be provided with only one mold portion and one plate assembly. Also, the moving means 42 could be a heavy duty press capable of physically forcing the punches 37 completely through the uncured rubber and causing the uncured rubber to flow into the grooves 26,36 to form the annular ribs 14,16 prior to the step of vulcanizing the sidewall protectors.

In view of the foregoing it is readily apparent that the structure of the present invention provides an improved method for building sidewall protectors and for forming the mounting portion thereof on a production basis with a high degree of uniformity. This is accomplished by providing a rigid mold in which the sidewall protector can be laid up with automated equipment and providing a separate device for forming the mounting portion of the sidewall protector while it remains in the mold. Furthermore, by resiliently biasing the plate assembly toward the mold so that the final forming of the mounting portion takes place during the curing step, a relatively light weight actuator can be used thereby negating the need for a large and expensive heavy-duty press for moving the plate assembly toward the mold.

Other aspects, objects and advantages of this invention can be obtained from a study of the drawings, the disclosure and the appended claims.

We claim:

1. A method of forming a mounting portion of an annular article (12) made from uncured elastomer on a rigid mold (19) comprising the steps of:
    moving a plate (32) having a plurality of punches (37) extending from one side (33) thereof toward the rigid mold;
    piercing the annular article with the punches and forming a plurality of holes (10) in the annular article;
    connecting the plate to the rigid mold with at least a portion of the annular article sandwiched therebetween;
    placing the rigid mold, annular article and plate in a vulcanizing apparatus; and
    curing the elastomer annular article.

2. The method of claim 1 wherein the step of moving the plate includes the step of resiliently biasing the plate toward the mold during the curing step.

3. The method of claim 2 wherein the resiliently biasing step includes the step of compressing a plurality of springs (47) positioned between the plate (32) and an enlarged head portion (48) at one end of a pin (46) and connecting the other end of the pin to the mold.

* * * * *